Figure 1:
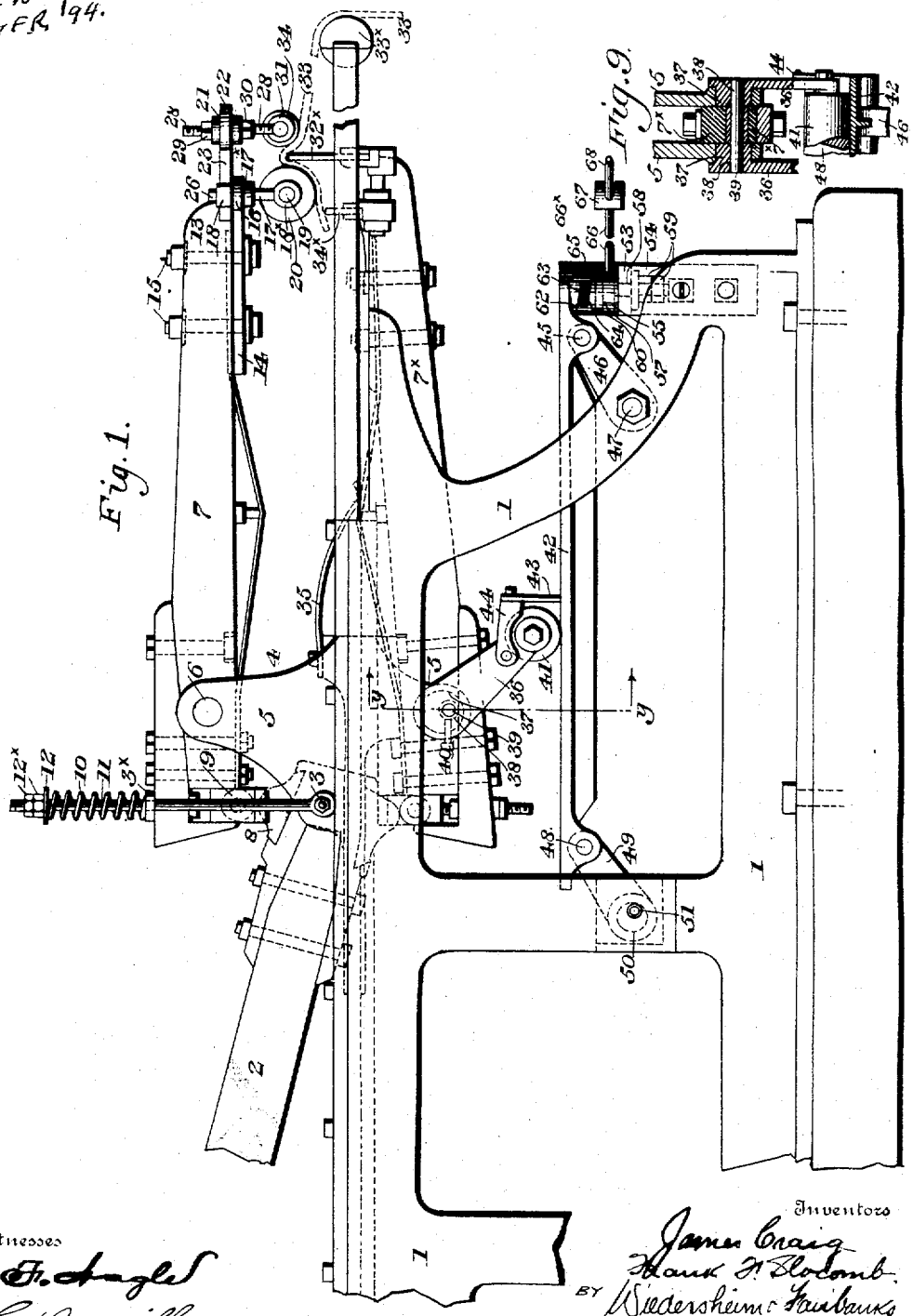

EXAMINER

No. 11,843. Reissued July 31, 1900.

J. CRAIG & F. F. SLOCOMB.

LEATHER STAKING MACHINE.

(Application filed Jan. 25, 1899.)

2 Sheets—Sheet 1.

Held valid in U.S. Ct. Slocomb v. Longman, 127 F.R. 94.

Witnesses
C. F. Angles
L. Howville.

Inventors
James Craig
Frank F. Slocomb
BY Wiedersheim & Fairbanks
Attorneys

THE NORRIS PETERS CO., PHOTO-LITHO., WASHINGTON, D. C.

No. 11,843. Reissued July 31, 1900.
J. CRAIG & F. F. SLOCOMB.
LEATHER STAKING MACHINE.
(Application filed Jan. 25, 1899.)
2 Sheets—Sheet 2.
Fig. 2.
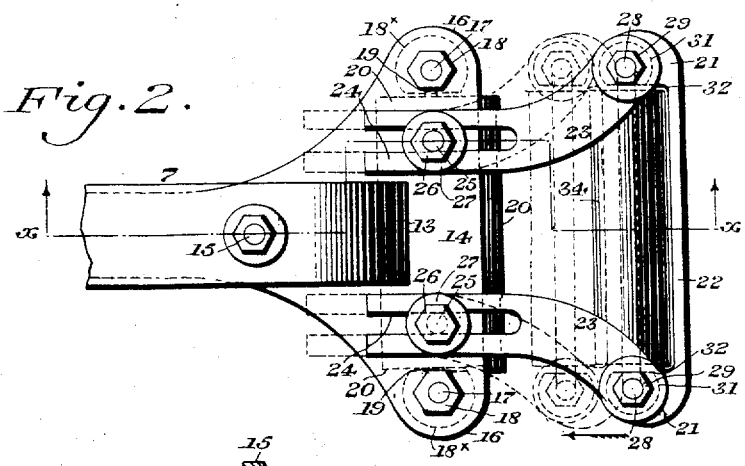
Fig. 3.
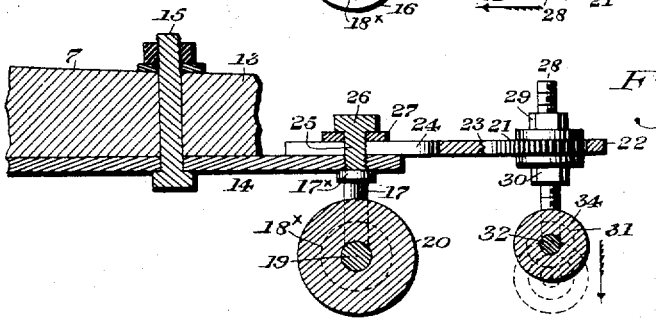
Fig. 5.
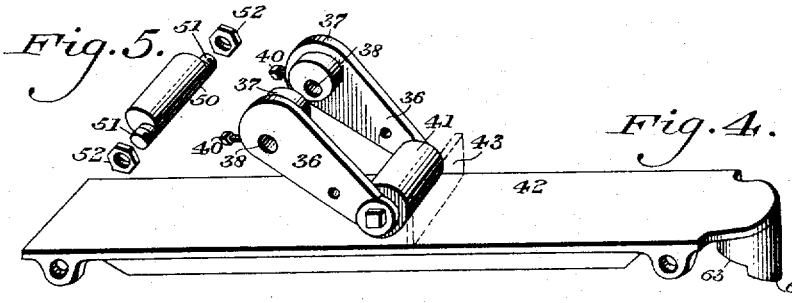
Fig. 4.
Fig. 7
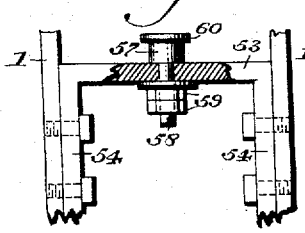
Fig. 8.
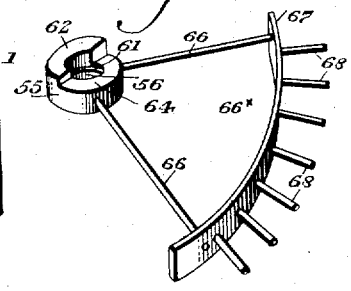
Fig. 6.
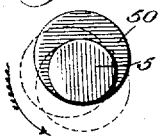
Witnesses
P. F. Eagles.
L. Donville.
Inventors
James Craig
Frank F. Slocomb
Wiedersheim & Fairbanks
Attorneys
THE NORRIS PETERS CO. PHOTO-LITHO. WASHINGTON, D. C.

UNITED STATES PATENT OFFICE.

JAMES CRAIG AND FRANK F. SLOCOMB, OF WILMINGTON, DELAWARE.

LEATHER-STAKING MACHINE.

SPECIFICATION forming part of Reissued Letters Patent No. 11,843, dated July 31, 1900.

Original No. 604,560, dated May 24, 1898. Application for reissue filed January 25, 1899. Serial No. 703,401.

*To all whom it may concern:*

Be it known that we, JAMES CRAIG and FRANK F. SLOCOMB, citizens of the United States, residing at Wilmington, in the county of New Castle, State of Delaware, have invented a new and useful Improvement in Leather-Staking Machines, which improvement is fully set forth in the following specification and accompanying drawings.

Our invention consists of an improved construction of leather-staking machine whereby we are enabled to effect an exact and delicate adjustment of pressure on the leather which is being staked while the machine is in motion.

It also consists of a novel arrangement of staking-rolls, one of which is capable of vertical and lateral adjustment, according to requirements.

It also consists of novel means for effecting the adjustment of the staking-jaws while the machine is in motion, at the same time enabling the operator to stand on both feet, as well as to effect the adjustment with accuracy and precision not heretofore attainable, and in addition permitting him to release the adjusting device instantly instead of being compelled to hold it in position.

It also consists of means for cleaning the table or plate, which assists in effecting the desired adjustment.

It further consists of novel details of construction, all as will be hereinafter fully set forth, and specifically pointed out in the claims.

Figure 1 represents a side elevation of a leather-staking machine embodying our invention, a portion of the same being broken away. Fig. 2 represents, on an enlarged scale, a plan view of the forward extremity of the upper jaw, showing the manner of effecting the lateral and vertical adjustment of one of the rolls carried thereon. Fig. 3 represents a section on line *x x*, Fig. 2. Fig. 4 represents a perspective view of the table or plate and the adjusting-roll employed, the same being shown in detached position. Fig. 5 represents a perspective view of a rod or shaft employed having its journals set eccentrically to its body. Fig. 6 represents, on an enlarged scale, an end elevation of the shaft seen in Fig. 5. Fig. 7 represents a front elevation of a portion of the housing seen in Fig. 1, showing the swiveling or retaining device for the knee-piece. Fig. 8 represents, on an enlarged scale, a perspective view of the knee-piece seen in Fig. 1. Fig. 9 represents a section on line *y y*, Fig. 1.

Similar numerals of reference indicate corresponding parts in the figures.

Referring to the drawings, 1 designates the housing of the machine, the same being of the usual or desired construction.

2 designates the connecting-rod employed, a portion of the same being broken away, it being of course understood that said connecting-rod may be actuated or reciprocated by means of a crank or other similar device. (Not shown.) 3 designates a pin or pivot common to said connecting-rod and to the plates 5, the general contour of said plates being understood from Fig. 1, and said plates when in assembled position forming, with their adjuncts, a cross-head 4, which reciprocates in suitable slides, a detailed description of the latter being deemed unnecessary, since the same is old in the art, said cross-head in practice being preferably cast in one piece.

7 designates the upper jaw, which is pivoted at 6 to the plates 5, the rear portion of said jaw 7 being provided with a roller 9, which is suitably supported and is adapted to contact with the cam 8, which is carried by the connecting-rod 2, the lower jaw $7^{\times}$ being actuated in substantially the same manner and it being evident that by reason of the construction and arrangement of the cams and their adjuncts when the parts are in the position seen in Fig. 1 the forward portion of the jaws will be caused to approach each other and remain in this position during the backward movement of the jaws, or, in other words, their movement to the left, said jaws opening when at their extreme left-hand portion and remaining open until at or near the end of their forward movement they reach about the position seen in Fig. 1, when they again close, the above construction and operation being old *per se* and forming no part of the present invention.

11 designates rods which are located on either side of the connecting-rod 2, each of said rods having one end attached to the pin or pivot 3 in the present instance, while their upper portions pass through the cross-bar 3×, upon which one end of the spring 10 is adapted to abut, the other end contacting with the washer 12, the tension being regulated by manipulating the nuts 12×, it being understood that each rod 11 is provided with a spring.

13 designates the forward end of the upper jaw, the same having the plate 14 attached thereto and held in position by means of the bolt 15. The forward portion of said plate 14 is in the present instance widened, as at 16, and has bolts or hangers 17 passing therethrough, said bolts being held in position by means of the shoulders 17× and the nuts 18, the lower portion of each of said bolts or hangers being provided with a bearing 18×, in which the journals 19 of the roller 20 revolve.

21 designates a plate, which is supported upon the plate 14, the former plate being provided with the cross-piece 22 and the arms 23, said arms being provided with the slots 24, through which pass the cap-screws or threaded stems 25, said stems each having the head 26 and the washers 27 thereon, by means of which the arms 23 are held in juxtaposition with said plate 14, and provision is thus made for enabling said arms 23 to be shifted laterally in the manner indicated in dotted lines in Fig. 2.

28 designates threaded stems located in the forward portion of the arms 23, said stems passing through said arms and being engaged on either side by the nuts 29 and 30, the lower portion of each of said stems being provided with a bearing 31, in which the journal 32 of the roller 34 revolves, it being thus evident that the roller 34 is capable of vertical adjustment by manipulating the nuts 29 and 30, as well as lateral adjustment upon the manipulation of the cap-screws 25.

32× designates a knife or blade which is attached to the forward portion of the lower jaw 7×, the latter having a pad or blade 34×, located in proximity to said blade 32×, the latter being somewhat longer than and located in advance of said pad 34×.

33 designates the hides or skin which is to be staked, the same passing over a breast beam or roller 33×, which is supported on stationary bearings in the forward part of the machine.

35 designates a spring which has its free end bearing on the lower jaw 7×, while its outer end is attached to any convenient portion of the machine.

36 designates a plurality of arms which are provided with the hubs 37, the latter having a bearing in the lower portion of the plates 5, said hubs having the openings 38 located eccentrically thereto, as indicated in Figs. 1, 4, and 9, and said arms, plates, and lower jaw 7× being held in proper relation to each other by means of the pin or rod 39, the latter being held in proper position by means of the set-screws 40.

It is evident that by changing the position of the eccentric-pin 39 the movement of the lower jaw 7× may be changed from up and down to an oblique or a lateral movement, as desired.

41 designates a roller which is journaled in the lower portion of the arms 36 and is adapted to travel on the plate or bed 42, which is movably supported, as will be hereinafter explained.

43 designates an upright plate or scraper which is attached to the arms 44, which latter are pivotally attached to the arms 36, the function of said scraper being to keep the bed 42 always clear in advance of the roller 41.

46 designates an arm which is pivotally attached at 45 to the forward portion of the bed 42, said arm being pivotally mounted at 47 on a suitable portion of the housing 1.

49 designates the arm on which the rear portion of the bed 42 is supported, said bed being attached to said arm by means of the pin 48, while said arm is mounted on the shaft 50, which has its journals located eccentrically to said shaft, as will be understood from Figs. 1, 5, and 6, said shaft 50 being held in proper position by means of nuts 52, which latter are removed from Fig. 1 for clearness of illustration.

53 designates a cross-piece (best seen in Fig. 7) which has the depending members 54, which are attached to the front of the housing 1. 55 designates a hub or block which is adapted to be supported on said cross-piece 53, said hub having an opening 56 therethrough, through which a portion 57 of the threaded stem 58 passes, said stem being provided with a head 60, which rests upon a shoulder 61 of the hub 55, the latter being thus held in the desired position and being freely rotated or oscillated, although any lateral or upward movement is prevented by reason of the nuts 59, which engage said stems 58.

62 designates the upper inclined or cam face of the hub 55, the same being adapted to contact with the inclined cam-face 63, attached to the forward portion of the table 42. (Best seen in Figs. 1 and 4.) 64 designates another lower cam-face located on the upper portion of the hub 55, the same being adapted to contact with the inclined or cam face 65 of the table 42. (Best seen in Fig. 4.)

66 designates a plurality of arms extending in radial or other directions from the hub 55 and connected with the plate 67, which latter is curved in the present instance and has the rods 68 projecting therefrom, which are adapted to be engaged by the knee of the attendant or operator.

69 designates a washer, preferably of vulcanized fiber or other material, which, in conjunction with the nuts 59 and the head 60 of the stem 58, acts as a frictional adjusting device to prevent any slipping or motion of the hub 55 and pressure-arc 67 and rods 68, attached thereto, which might be caused by the vibration or jarring of the machine. The nuts 59, as will be apparent, are intended to adjust the tension on said hub 55.

The operation is as follows: The jaws 7 and 7× when at or near their extreme forward position appear as seen in Fig. 1, the knife 32× assuming a position intermediate the rollers 20 and 34. The hide to be staked is indicated in dotted lines at 33 at the right of Fig. 1, and the same having been placed in position and held between the body of the operator and the beam or roll 33× the jaws 7 and 7× are caused to move backwardly or to the left through the medium of the connecting-rod 2, and the hide 33 being held stationary by the attendant it will be seen that the proper treatment will be imparted thereto during the rearward movement of the rolls 20 and 34 and the blades 34× and 32×, the operator or attendant shifting the hide or skin as desired until every portion of the same has been treated or staked.

The thickness of hides varies according to the class of work, and by adjusting the distance between the rollers 34 and 20 the machine can be regulated according to the class of hide under operation, while during operation the jaw 7× can be adjusted to conform to the varying thickness of a particular hide. The distance between the rollers 34 and 20 can be regulated by loosening the stems or screws 25 and moving the arms 23 toward or away from the roller 20, thereby imparting a lateral adjustment of the roller 34. The roller 34 is also enabled to be vertically adjusted, when desired, by manipulating the nuts 29 and 30, and thus shifting vertically the stem 28, and consequently said roller 34.

The upward and downward movement of the jaw 7× can be adjusted with great exactness during the operation of the machine without stopping the latter by the operator oscillating in a lateral direction to the desired extent the knee-piece 66×. (Seen in Figs. 1 and 8.) The desired lateral oscillation is imparted by the knee of the operator, whereby the contact of the inclined or cam surfaces will cause the table or bed 42 to be raised or lowered, and the adjustment of the rear portion of said table can be readily effected by rotating to the desired extent the rod or shaft 50, having the eccentric journals 51 located thereon in the manner described, the different extremes of position which the rod 50, having its eccentric journals 51, may be caused to assume being indicated in Fig. 6, the table 42 requiring no attention after being once adjusted. The elevation or depression of the table or bed 42 will cause a corresponding movement to be imparted to the roll 41, and consequently a slight oscillation will be imparted by reason of the eccentric bearings on the arms 36 to the lower jaw 7×, as will be understood from Figs. 1 and 9, the extent of adjustment being regulated with great exactness by means of the eccentric connections. (Seen in Figs. 1 and 9.)

The foot-treadles heretofore in use for adjusting the pull or pressure on machines of this class while in motion have been fundamentally imperfect and objectionable in that they necessitated the attendant's maintaining a continual pressure. In practice the effect of this has usually been so fatiguing that the operator is found to depress the treadle constantly to the floor or other stop in order to support his weight on both feet. Obviously the result of this has been to make the treadle, instead of a means of regulating the pressure, merely a device for applying it. With our swiveling or laterally-movable device the pressure is not only applied, but regulated with great accuracy and precision, and the operator can change the pressure with each skin, as he should do, instantly, and without the slightest fatigue or interruption to his work, and the frictional adjusting device holds the swivel just where it is placed, being capable of adjustment, so that the swivel shall not change position on account of any vibration of the machine, nor, on the other hand, move so stiffly as to require any exertion of force. It will further be apparent that were the treadle motion not fatiguing it would still be objectionable on the ground that it does not admit of accuracy, because it is evidently impossible for the attendant to control the motion of one foot with anything approaching precision even for a short time while compelled to balance his weight on the other foot.

Having thus described our invention, what we claim as new, and desire to secure by Letters Patent, is—

1. In a leather-staking machine, a plurality of rollers mounted on a jaw thereof, and means for enabling one of said rollers to be raised or lowered independently of the other roller.

2. In a leather-staking machine, a plurality of rollers mounted on a jaw thereof, means for enabling one of said rollers to be raised and lowered independently of the other, and means for varying the distance between said rollers.

3. In a leather-staking machine, an upper jaw, a lower jaw, a blade carried by said lower jaw, a roller mounted in bearings attached to said upper jaw, adjustable arms carried by said upper jaw, stems adjustably supported in said arms, means for securing said stems in their adjusted positions and a roller having bearings in said stems.

4. In a leather-staking machine, an upper jaw, a roller mounted in suitable bearings attached to said jaw, adjustable arms carried by the latter, said arms supporting adjustable threaded stems, and a roller having bearings in said stems.

5. In a leather-staking machine, an upper jaw, a roller journaled thereupon, arms adjustably mounted on said jaw, adjustable stems supported by said arms, and a roller journaled in said stems.

6. In a leather-staking machine, an upper jaw having a plate attached thereto, a roller journaled in bearings depending from said plate, slotted arms having a cross-piece attached thereto, means for securing said arms to said plate, bearings capable of vertical adjustment depending from said arms, and a roller journaled in said bearings.

7. In a leather-staking machine, a cross-head having upper and lower jaws pivotally mounted therein, means for reciprocating and for opening and closing said jaws, a plurality of arms having hubs journaled in said cross-head, openings in said arms located eccentrically in said hubs, a rod passing through said openings, means for holding said rod in position, and means for raising and lowering said arms.

8. In a leather-staking machine, a bed or table, arms pivotally attached thereto and supported from the housing of the machine, an inclined or cam-faced projection depending from said table and adapted to contact with a hub having corresponding inclines thereon, and means for actuating said hub, in combination with connections from said bed for adjusting the lower jaw of the machine.

9. In a leather-staking machine, a bed or plate movably supported, arms common to said bed and to the housing of the machine, one of said arms having a shaft passing therethrough, said shaft being provided with bearings eccentric thereto, means for raising and lowering said bed, and connections from the latter to the lower jaw of the machine for adjusting said jaw.

10. In a leather-staking machine, a cross-piece, a hub supported thereupon, said hub having an opening therethrough and a shoulder therein, a threaded stem passing through said opening, and having a head adapted to engage said shoulder, a plurality of cam-faces on said hub, a table having a plurality of cam-faces thereon, arms extending from said hub and having a plate attached thereto, and pins projecting from said plate, in combination with connections common to said plate and to the lower jaw of the machine for adjusting said jaw without stopping the operation of the machine.

11. In a leather-staking machine, upper and lower jaws, a table, suitably supported, means for raising and lowering said table, a roller supported upon the latter, arms common to said roller and to one of said jaws, a scraper adapted to contact with said table, said scraper being located in advance of said roller, and suitably attached to said arms, and means for reciprocating and opening and closing said jaws.

12. In a leather-staking machine, an upper and lower jaw, a cross-head therefor, a plurality of arms having hubs mounted in said cross-head, openings in said hubs eccentrically located, a rod passing through said openings and the lower jaw of the machine, and means for raising and lowering said arms.

13. In a leather-staking machine, an upper and lower jaw, a roller mounted in suitable bearings attached to said upper jaw, adjustable arms carried by the latter, stems adjustably supported in said arms, and a roller having bearings in said stems, in combination with a plurality of upright blades attached to said lower jaw, one of said blades occupying the space between said rollers when said jaws are in their forward position.

14. In a leather-staking machine, a bed, arms pivotally attached thereto and supported from the housing of the machine, an inclined or cam-faced projection on said bed, adapted to contact with a hub having corresponding inclines thereon, and means for supporting and actuating said hub.

15. In a leather-staking machine, a hub suitably supported and having an opening therethrough, and a shoulder therein, a stem passing through said opening and provided with a head adapted to engage said shoulder, and hold said hub in position, a plurality of cam-faces on said hub, a table suitably supported and also provided with a plurality of cam-faces, and devices attached to said hub whereby the latter can be rotated by the knee of the attendant.

16. In a leather-staking machine, pivoted jaws, suitably supported, a movable bed, a roller carried by the lower of said jaws and bearing on said bed, a cam-face carried by said bed, and a rotatable hub having a cam-face adapted to register with the cam-face carried by the bed.

17. In a leather-staking machine, an upper and lower jaw pivotally supported, a movable bed, means for supporting the latter, a roller carried by said lower jaw and bearing on said bed, a cam-face on the latter, a rotatable hub having a cam-face adapted to coact with said first-mentioned cam-face, and means for actuating said hub, said means being controlled and actuated by the knee of the operator.

18. In a leather-staking machine, a pivoted jaw, the pivoted arms, a bed supported by said arms, a roller carried by said jaw and bearing on said bed, a cam-face carried by said bed, and a rotatable hub bearing a cam-face adapted to contact with the cam-face carried by said bed.

19. In a leather-staking machine, upper and lower jaws pivotally supported, a blade carried by said lower jaw, a roller mounted in bearings attached to said upper jaw, arms carried by the latter, stems adjustably supported in said arms, means for locking said stems in position and a second roller having bearings in said stems.

20. In a leather-staking machine, an upper and lower jaw pivotally supported, a movable bed, means for sustaining the latter, connections common to said bed and jaw for operating the latter, a cam-face on said bed, a rotatable element having a cam-face thereon adapted to coact with the first-mentioned cam-face, and means for actuating said element, said means being controlled and actuated by the knee of the operator.

21. In a leather-staking machine, in combination with the jaws thereof, mechanism for reciprocating and opening and closing said jaws, and laterally-movable means for adjusting said jaws, said means being controlled and operated by the knee of the attendant.

22. In combination with the jaws of a leather-staking machine, mechanism for actuating said jaws, laterally-movable means controlled by the knee of the operator for adjusting one of said jaws, and a frictional adjusting device for controlling said jaw-adjusting means.

23. The combination with the jaws of a leather-staking machine, of mechanism for reciprocating and opening and closing said jaws, and laterally-movable means for adjusting one of said jaws, said means being located below said jaws.

JAMES CRAIG.
FRANK F. SLOCOMB.

Witnesses:
EMMA L. BURNS,
CLARENCE A. PIERCE.